(12) United States Patent
Albertin et al.

(10) Patent No.: US 11,150,371 B2
(45) Date of Patent: Oct. 19, 2021

(54) SYSTEM AND METHOD FOR DERIVING RESERVOIR STRESSES FROM 4D SEISMIC DATA

(71) Applicant: Chevron U.S.A. Inc., San Ramon, CA (US)

(72) Inventors: Uwe K. Albertin, Katy, TX (US); Joseph P. Stefani, San Ramon, CA (US); Andrey H. Shabelansky, Houston, TX (US); Mark A. Meadows, San Ramon, CA (US)

(73) Assignee: CHEVRON U.S.A. INC., San Ramon, CA (US)

(*) Notice: Subject to any disclaimer, the term of this patent is extended or adjusted under 35 U.S.C. 154(b) by 376 days.

(21) Appl. No.: 16/136,755

(22) Filed: Sep. 20, 2018

(65) Prior Publication Data

US 2019/0086568 A1 Mar. 21, 2019

Related U.S. Application Data

(60) Provisional application No. 62/561,482, filed on Sep. 21, 2017.

(51) Int. Cl.
*G01V 1/30* (2006.01)
*G01V 1/34* (2006.01)

(52) U.S. Cl.
CPC ............... *G01V 1/308* (2013.01); *G01V 1/30* (2013.01); *G01V 1/306* (2013.01); *G01V 1/34* (2013.01); *G01V 2210/6242* (2013.01); *G01V 2210/6248* (2013.01); *G01V 2210/64* (2013.01)

(58) Field of Classification Search
CPC .......... G01V 1/308; G01V 1/30; G01V 1/306; G01V 1/34; G01V 2210/64; G01V 2210/6248; G01V 2210/6242; G01V 99/005; G01V 1/282; G01V 1/614; G01V 1/28; G01V 1/303; G01V 1/307; G01V 1/50; G01V 1/286; G01V 1/362; G01V 2210/67; G01V 2210/675; G01V 2210/6122; G01V 2210/6161; G01V 2210/42; G01V 2210/632;

(Continued)

(56) References Cited

U.S. PATENT DOCUMENTS 10,459,096 B2 * 10/2019 Tan .................. G06F 17/11
2003/0117894 A1 * 6/2003 Curtis .................. G01V 1/32
367/58
2008/0033656 A1 2/2008 Herwanger
(Continued)

OTHER PUBLICATIONS

Fracois Clement et al., Migration-based Traveltime Waveform Inversion of 2-D Simple Structures: A Synthetic Example, Geophysics, May-Jun. 2001, 845-860, vol. 66, No. 3.

(Continued)

*Primary Examiner* — Alessandro V Amari
*Assistant Examiner* — Carter W Ferrell
(74) *Attorney, Agent, or Firm* — Sheppard, Mullin, Richter & Hampton LLP

(57) ABSTRACT

A method is described for seismic imaging including determination of reservoir stresses. The method may include the use of elastic full waveform inversion (FWI), $3^{rd}$-order elasticity, and finite-difference strain calculations. The method may be executed by a computer system.

9 Claims, 7 Drawing Sheets

Change in surface seismic data due to change in stress in reservoir

Direct inversion of Cij change in elastic FWI

Third-order elasticity
Gives strains = Eij

Finite-difference strain calculations
Inversion to give stresses

Pore pressure changes

(58) Field of Classification Search
CPC ......... G01V 2210/646; G01V 2210/66; G01V 2210/679; G01V 11/00; G06F 30/23
See application file for complete search history.

(56) References Cited

U.S. PATENT DOCUMENTS

| | | | |
|---|---|---|---|
| 2008/0165619 A1* | 7/2008 | Bachrach | G01V 1/30 367/38 |
| 2016/0061974 A1* | 3/2016 | Bansal | G01V 1/303 703/2 |
| 2016/0161634 A1 | 6/2016 | Stefani | |
| 2016/0291180 A1* | 10/2016 | Washbourne | G01V 1/282 |

OTHER PUBLICATIONS

Bjorn Engquist et al., Application of the Wasserstein Metric to Seismic Signals, Communications in Mathematical Sciences, 2014, 979-988, vol. 12, No. 5.

Tong W. Fei et al., Full Waveform Inversion without Low Frequencies: A Synthetic Study, SEG Las Vegas Annual Meeting, 2012, 1-5.

K. Jiao et al., Matching Pursuit Full Waveform Inversion, 77th EAGE Conference & Exhibition, Jun. 1-4, 2015, IFEMA Madrid, Spain.

Patrick Lailly, The Seismic Inverse Problem as a Sequence of Before Stack Migrations, in Conference on Inverse Scattering: Theory and Applications: Society for Industrial and Applied Mathematics, 1983, pp. 206-220.

L. Metivier et al., An Optimal Transport Distance for Full Waveform Inversion: Application to the 2014 Chevron Benchmark Data-Set, SEG International Exposition and 86th Annual Meeting, 2016, 1278-1283.

Peng Shen et al., Differential Semblance Velocity Analysis by Wave-Equation Migration, Society of Exploration Geophysicists, 73rd Annual International Meeting, Expanded Abstracts, 2003, 2132-2135.

Peng Shen et al., Automatic Velocity Analysis Via Shot Profile Migration, Geophysics, Sep.-Oct. 2008, VE49-VE59, vol. 73, No. 5.

Albert Tarantola, Inversion of Seismic Reflection Data in the Acoustic Approximation, Geophysics, Aug. 1984, 1259-1266, vol. 49, No. 8.

Sheng Xu et al., Inversion on Reflected Seismic Wave, SEG Las Vegas Annual Meeting, 2012, 1-7.

Zhiguang Xue et al., Full Waveform Inversion Using Smoothing Kernels, SEG International Exposition and 86th Annual Meeting, SEG Technical Program Expanded Abstracts, 2016, 1358-1363.

PCT International Search Report and Written Opinion, dated Jan. 4, 2019, issued in International Application No. PCT/IB2018/057245, filed on Sep. 20, 2018, 13 pages.

Lu, R. et al., "High-Resolution Elastic FWI for Reservoir Characterization", 75th EAGE Conference & Exhibition incorporating, SPE EUROSPEC, London, UK, Jun. 10-13, 2013.

* cited by examiner

SYSTEM AND METHOD FOR DERIVING RESERVOIR STRESSES FROM 4D SEISMIC DATA

CROSS-REFERENCE TO RELATED APPLICATIONS

The present application claims the priority benefit of U.S. Provisional Application Ser. No. 62/561,482, filed on Sep. 21, 2017, which is incorporated herein by reference in its entirety.

STATEMENT REGARDING FEDERALLY SPONSORED RESEARCH OR DEVELOPMENT

Not applicable.

TECHNICAL FIELD

The disclosed embodiments relate generally to determining physical properties of subterranean volumes of interest and, in particular, to a method of deriving reservoir stresses from time-lapse (4D) seismic data in order to identify pressure changes in the subterranean volume of interest.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which is associated with a plurality of traces recorded at the plurality of sensors.

The production of hydrocarbons causes changes in the elastic parameters of the earth. These changes may occur due to water displacing oil (or vice versa), water displacing gas (or vice versa), or gas displacing oil (or vice versa), within the reservoir interval. In other cases, the changes in the elastic parameters may occur due to enhanced hydrocarbon recovery operations, CO2 injection, or clathrate dissociation from solid to gas. Time-lapse (4D) seismic data are acquired to compare seismic data at different times via two or more seismic surveys, a seismic survey at time one ($T_1$) and another seismic survey from time two ($T_2$), conducted months or years apart. The differences in the seismic responses for $T_1$ and $T_2$ are due to fluid movement and/or pressure changes due to production or injection of water or gas. Conventionally, these differences in seismic response are qualitatively interpreted relative to modeled response behaviors due to fluid and pore pressure changes. Typically, the seismic survey from $T_1$ is referred to as the baseline survey, and the seismic survey from $T_2$ is referred to as the monitor survey. However, in the case for more than one monitor survey we could be analyzing two monitor surveys, where the seismic survey from $T_1$ is an early monitor survey and the seismic survey from $T_2$ is another monitor survey recorded at some time $T_2$, where $T_2$ is months or years after $T_1$.

Seismic data are processed to create seismic images that can be interpreted to identify subsurface geologic features including hydrocarbon deposits. This processing includes determining the subsurface rock properties, such as the seismic velocities throughout the subsurface. Determining the subsurface rock properties allows seismic imaging that produces interpretable images so that rock and fluid property changes can be identified. The ability to define the location of rock and fluid property changes in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for identifying reservoir stresses in subterranean volumes of interest to improve velocity estimation and seismic imaging for the purpose of better producing hydrocarbons.

SUMMARY

In accordance with some embodiments, a method of seismic imaging including determination of reservoir stresses is disclosed. The method may include the use of elastic full waveform inversion (FWI), $3^{rd}$-order elasticity, and finite-difference strain calculations.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

Like reference numerals refer to corresponding parts throughout the drawings.

DETAILED DESCRIPTION OF EMBODIMENTS

Figure 1:
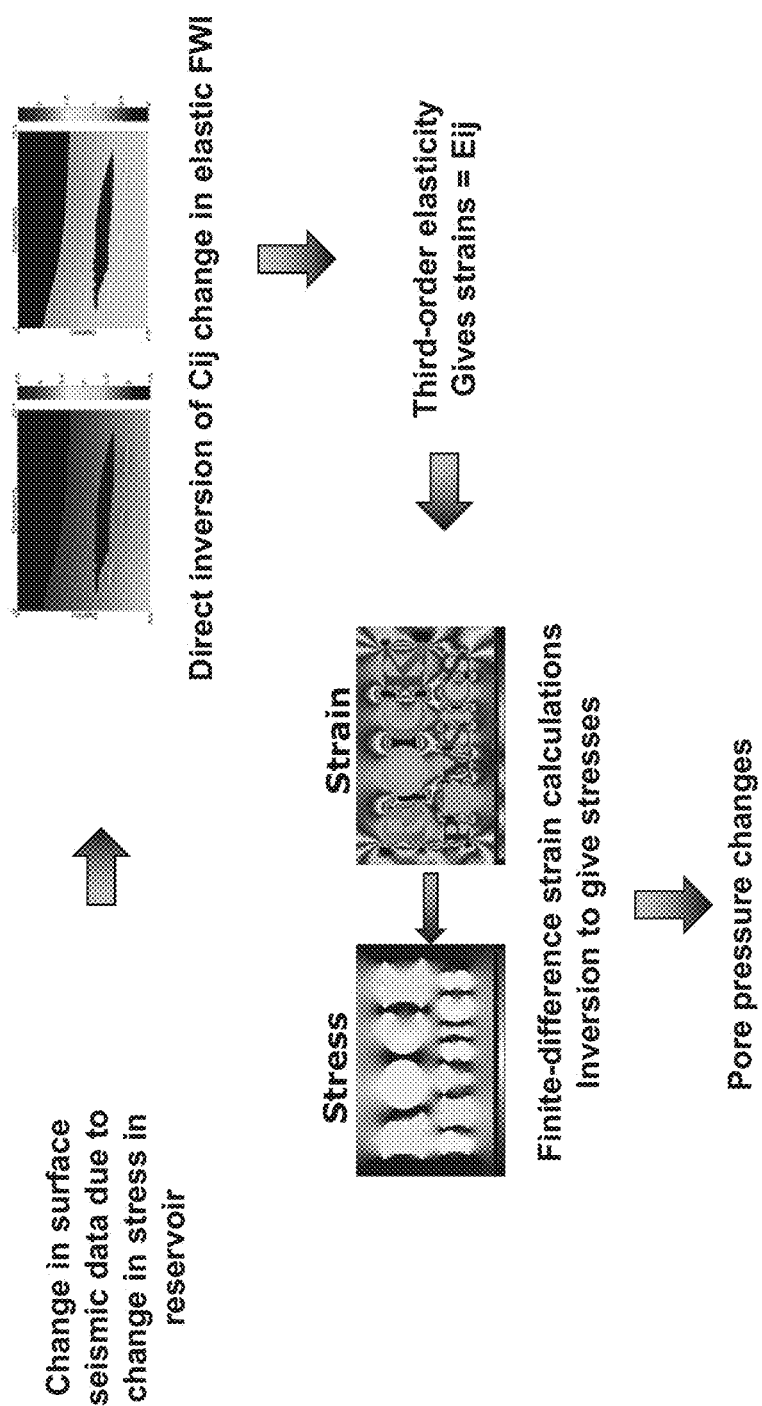
FIG. 1 illustrates a flowchart of a method of deriving reservoir stresses that can be used to calculate pore pressure changes, in accordance with some embodiments.

Described below are methods, systems, and computer readable storage media that provide a manner of seismic imaging. These embodiments are designed to be of particular use for seismic imaging of subsurface volumes where it is suspected that the pore pressure in a hydrocarbon reservoir may have changed.

Advantageously, those of ordinary skill in the art will appreciate, for example, that the embodiments provided herein may be utilized to generate a more accurate digital seismic image (i.e., the corrected digital seismic image). The more accurate digital seismic image may improve hydrocarbon exploration and improve hydrocarbon production. The more accurate digital seismic image may provide details of the subsurface that were illustrated poorly or not at all in traditional seismic images. Moreover, the more accurate digital seismic image may better delineate where different features begin, end, or any combination thereof. As one example, the more accurate digital seismic image may illustrate faults more accurately. As another example, assume that the more accurate digital seismic image indicates the presence of a hydrocarbon deposit. The more accurate digital seismic image may delineate more accurately the bounds of the hydrocarbon deposit so that the hydrocarbon deposit may be produced.

Those of ordinary skill in the art will appreciate, for example, that the more accurate digital seismic image may be utilized in hydrocarbon exploration and hydrocarbon production for decision making. For example, the more accurate digital seismic image may be utilized to pick a location for a wellbore. Those of ordinary skill in the art will appreciate that decisions about (a) where to drill one or more wellbores to produce the hydrocarbon deposit, (b) how many wellbores to drill to produce the hydrocarbon deposit, etc. may be made based on the more accurate digital seismic image. The more accurate digital seismic image may even be utilized to select the trajectory of each wellbore to be drilled. Moreover, if the delineation indicates a large hydrocarbon deposit, then a higher number of wellbore locations may be selected and that higher number of wellbores may be drilled, as compared to delineation indicating a smaller hydrocarbon deposit.

Those of ordinary skill in the art will appreciate, for example, that the more accurate digital seismic image may be utilized in hydrocarbon exploration and hydrocarbon production for control. For example, the more accurate digital seismic image may be utilized to steer a tool (e.g., drilling tool) to drill a wellbore. A drilling tool may be steered to drill one or more wellbores to produce the hydrocarbon deposit. Steering the tool may include drilling around or avoiding certain subsurface features (e.g., faults, salt diapirs, shale diapirs, shale ridges, pockmarks, buried channels, gas chimneys, shallow gas pockets, and slumps), drilling through certain subsurface features (e.g., hydrocarbon deposit), or any combination thereof depending on the desired outcome. As another example, the more accurate digital seismic image may be utilized for controlling flow of fluids injected into or received from the subsurface, the wellbore, or any combination thereof. As another example, the more accurate digital seismic image may be utilized for controlling flow of fluids injected into or received from at least one hydrocarbon producing zone of the subsurface. Chokes or well control devices, positioned on the surface or downhole, may be used to control the flow of fluid into and out. For example, certain subsurface features in the more accurate digital seismic image may prompt activation, deactivation, modification, or any combination thereof of the chokes or well control devices so as control the flow of fluid. Thus, the more accurate digital seismic image may be utilized to control injection rates, production rates, or any combination thereof.

Those of ordinary skill in the art will appreciate, for example, that the more accurate digital seismic image may be utilized to select completions, components, fluids, etc. for a wellbore. A variety of casing, tubing, packers, heaters, sand screens, gravel packs, items for fines migration, etc. may be selected for each wellbore to be drilled based on the more accurate digital seismic image. Furthermore, one or more recovery techniques to produce the hydrocarbon deposit may be selected based on the more accurate digital seismic image.

In short, those of ordinary skill in the art will appreciate that there are many decisions (e.g., in the context of (a) steering decisions, (b) landing decisions, (c) completion decisions, (d) engineering control systems and reservoir monitoring in the following but not limited to: Tow Streamer, Ocean Bottom Sensor, VSP, DASVSP, and imaging with both primaries and free surface multiple, etc.) to make in the hydrocarbon industry and making proper decisions based on more accurate digital seismic images should improve the likelihood of safe and reliable operations. For simplicity, the many possibilities, including wellbore location, component selection for the wellbore, recovery technique selection, controlling flow of fluid, etc., may be collectively referred to as managing a subsurface reservoir.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Seismic imaging of the subsurface is used to identify potential hydrocarbon reservoirs. Seismic data are acquired at a surface (e.g. the earth's surface, ocean's surface, or at the ocean bottom) as seismic traces which collectively make up the seismic dataset. Seismic imaging generally requires an earth model of the subsurface, which may include the P-wave (Vp) velocity, the S-wave (Vs) velocity, the density, and other parameters. The subsurface velocity may be derived from the seismic data via various methods, such as tomography and full waveform inversion (FWI). When considering 4D seismic data, the recorded seismic data will have differences caused by differences in the subsurface properties which affect the elastic properties Vp, Vs, and/or density.

In an embodiment, the present invention estimates reservoir stresses and pressures from 4D seismic data. FIG. 1 illustrates a flow chart relating geomechanics to elastic inversion in a subterranean reservoir. It begins with the 4D seismic data that has a difference between the recorded seismic data at $T_1$ and the seismic data recorded at $T_2$. The 4D seismic data are inverted via elastic FWI to get the stiffness changes. The stiffness changes can be converted to strain changes using $3^{rd}$-order elasticity relations. The strain changes can be inverted for time-lapse stresses and pore pressures in the reservoir using elastostatic Green functions connecting reservoir pore pressure changes to the induced strain. These reservoir pore pressure and stress changes can be used to refine the reservoir models, thereby helping to improve the seismic reservoir imaging and to identify potential drilling and production hazards.

Figure 2:
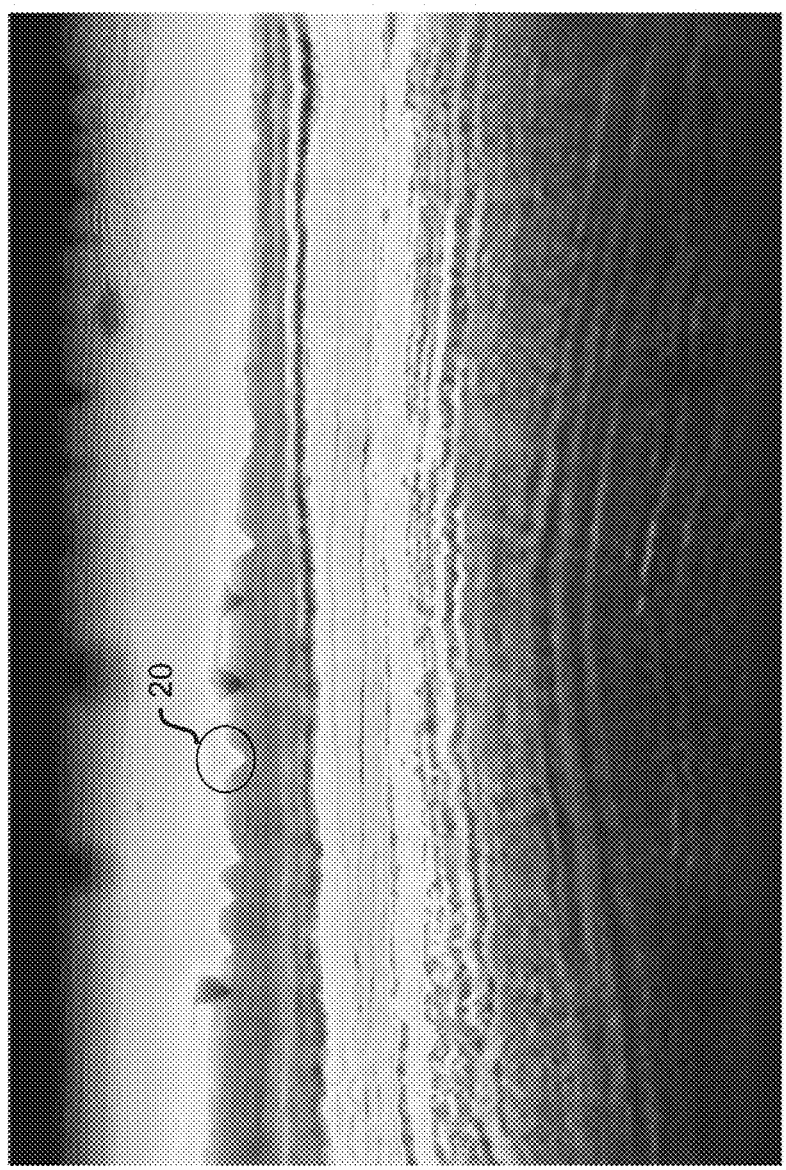
FIG. 2 is a seismic velocity model with a 4D change related to stress in the reservoir.

FIG. 2 shows a Vp model with an anomaly 20 that is caused by reservoir stresses. The stresses arise due to changes in the pore pressure between the $T_1$ and $T_2$ seismic surveys.

Figure 3:
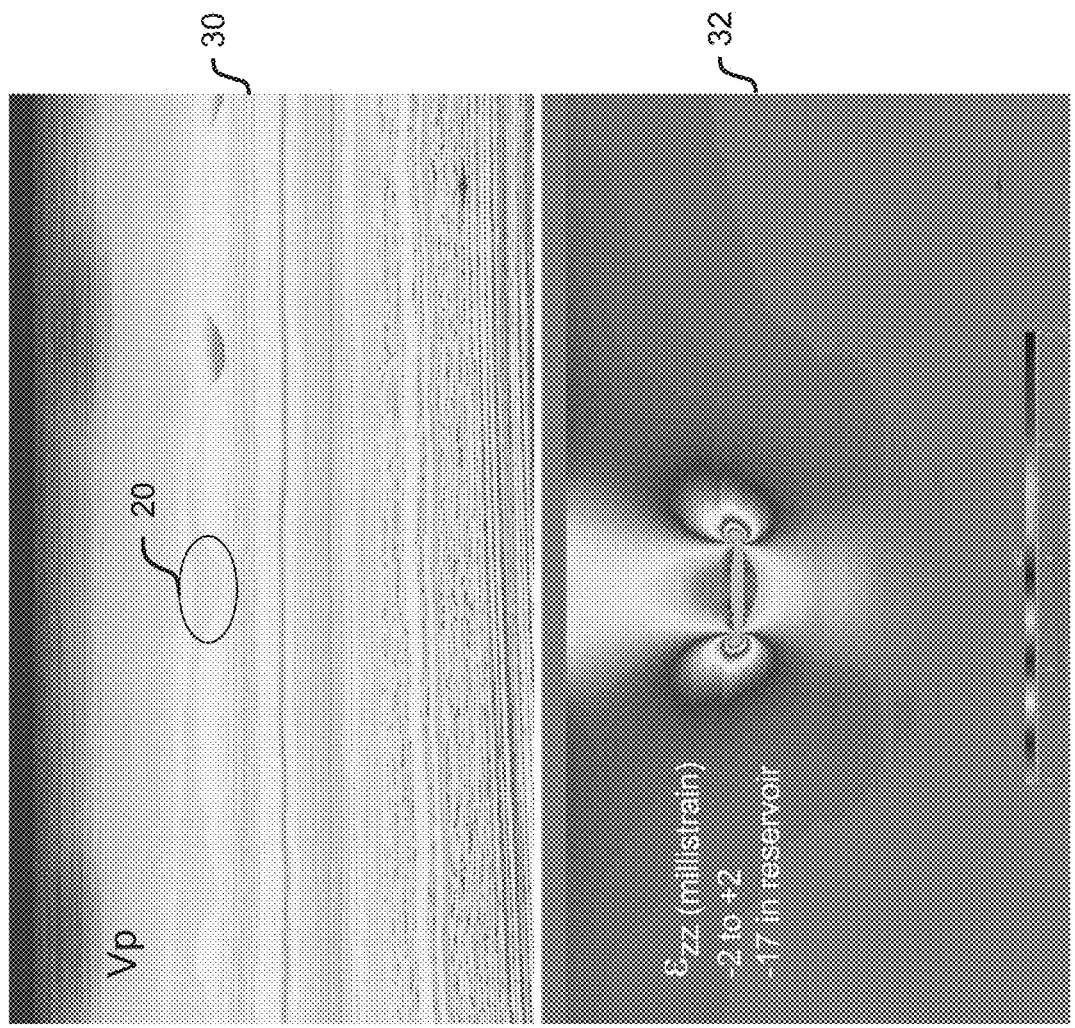
FIG. 3 illustrates a seismic velocity model and a strain field associated with it.

FIG. 3 illustrates the strain field 32 that is associated with the anomaly 20 from the Vp model 30. Note that the Vp model 30 is a zoomed-in version of the Vp model in FIG. 2.

Figure 4:
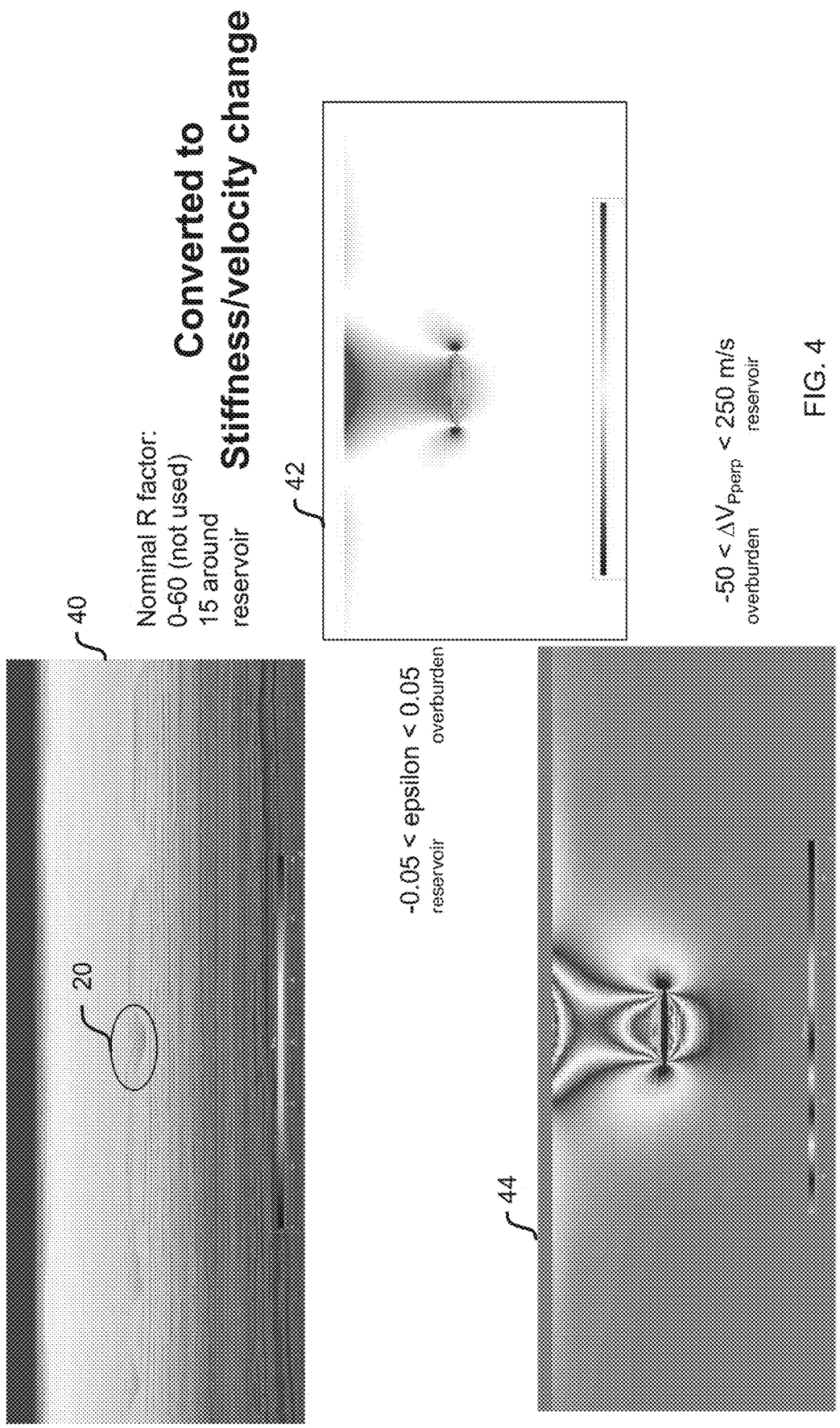
FIG. 4 shows an R-factor model, a strain model, and the corresponding velocity perturbation.

FIG. 4 illustrates a byproduct "R factor" field 40 that can be used to estimate physical strain from measured seismic time strains, together with the anomaly 20. The associated induced seismic velocity anisotropy 42 and velocity change 44 are shown.

Figure 5:
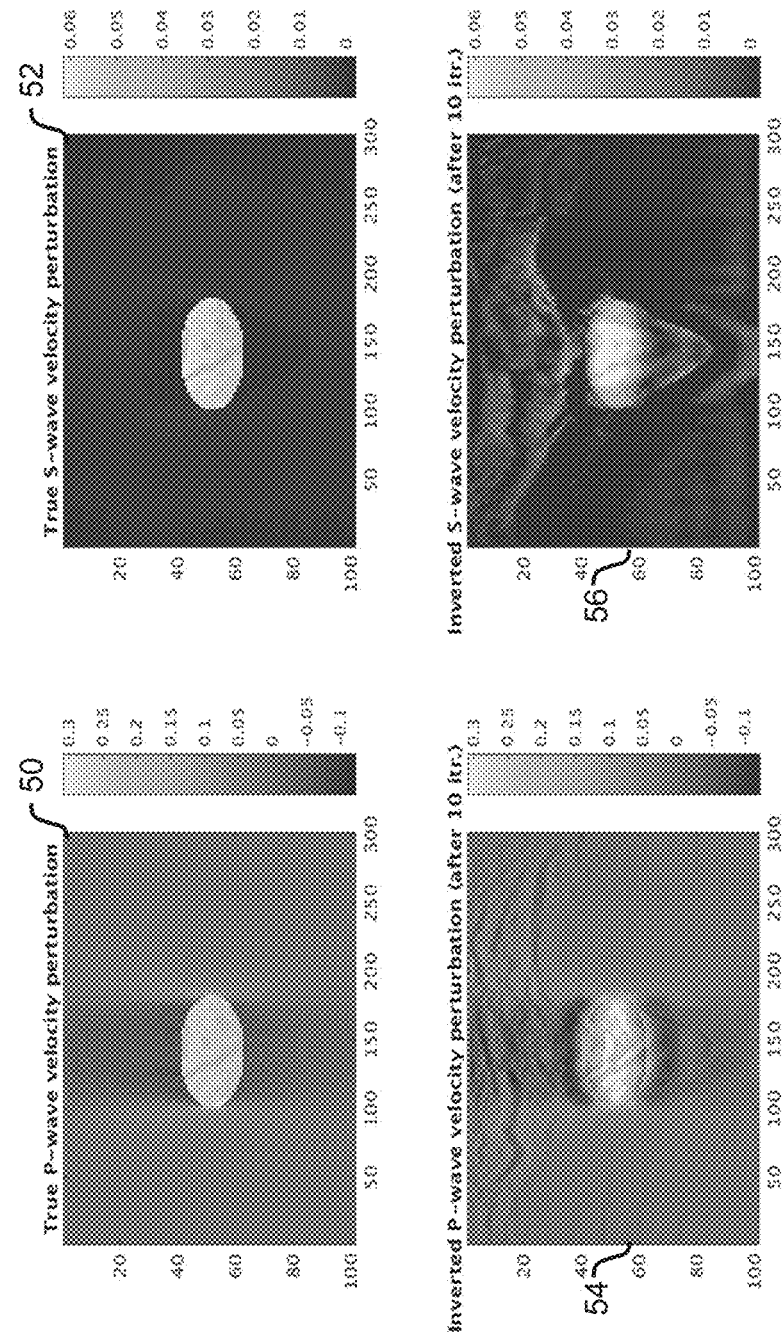
FIG. 5 compares P-wave (Vp) and S-wave (Vs) velocity models with a perturbation and the resultant inverted velocity models.

FIG. 5 shows the results of an embodiment of the present method. The true Vp perturbation model 50 and the true Vs perturbation model 52 have been accurately derived by the method, shown as inverted Vp perturbation model 54 and inverted Vs perturbation model 56, respectively. These accurate velocity perturbations can be used to modify the velocity models for use in seismic imaging, resulting in more accurate seismic images to be used for the purposes of interpreting physical properties in the subsurface in order to produce hydrocarbons more effectively and to monitor the subsurface for production hazards.

Figure 6:
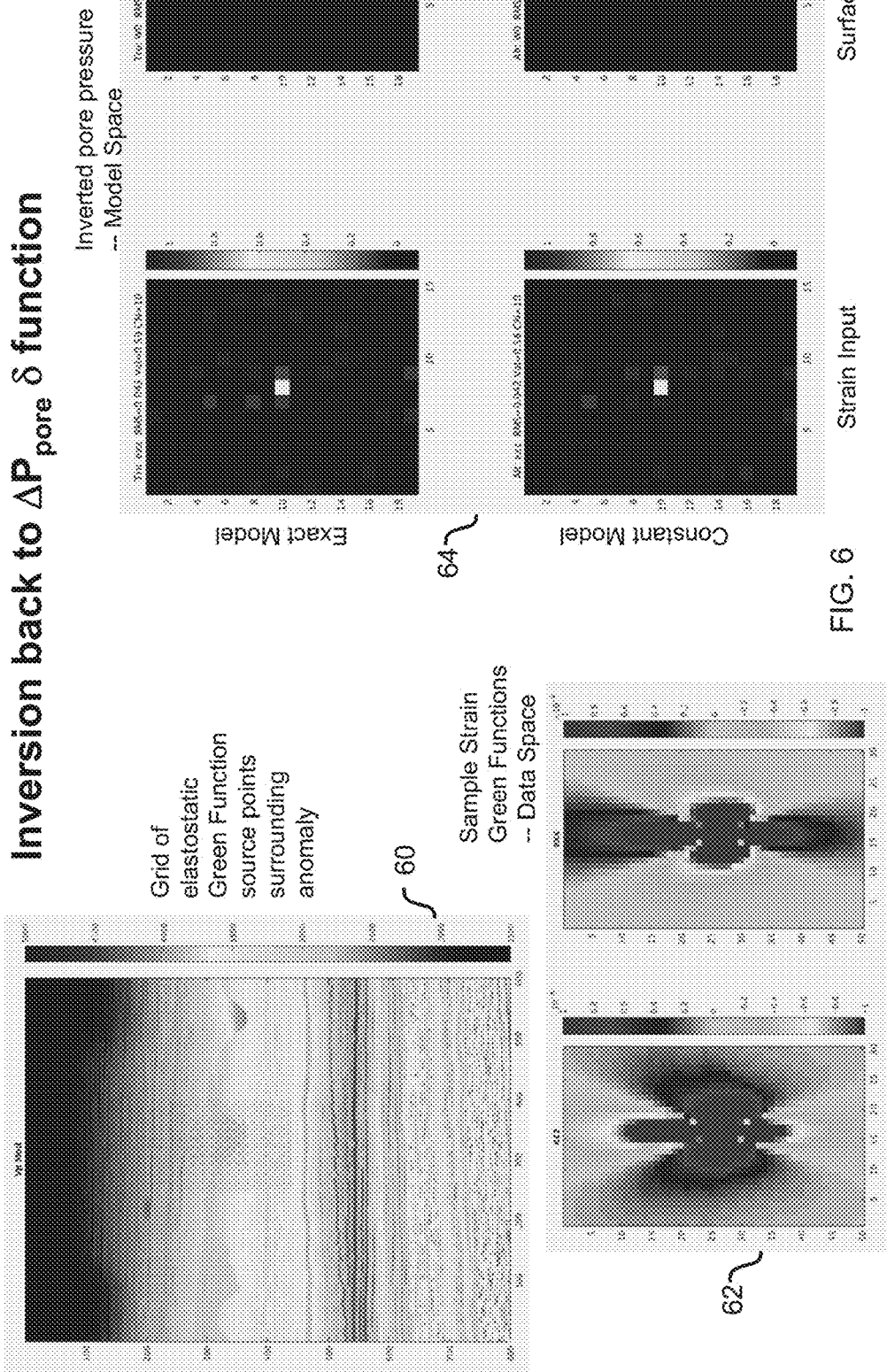
FIG. 6 demonstrates the inversion process to obtain the change in pore pressure.

FIG. 6 shows the Vp model 60 with a grid of Green Function source points surrounding the anomaly. Examples of the data-space strain Green Functions are in panel 62. The result of the inversion to pore pressure can be seen in panel 64.

Figure 7:
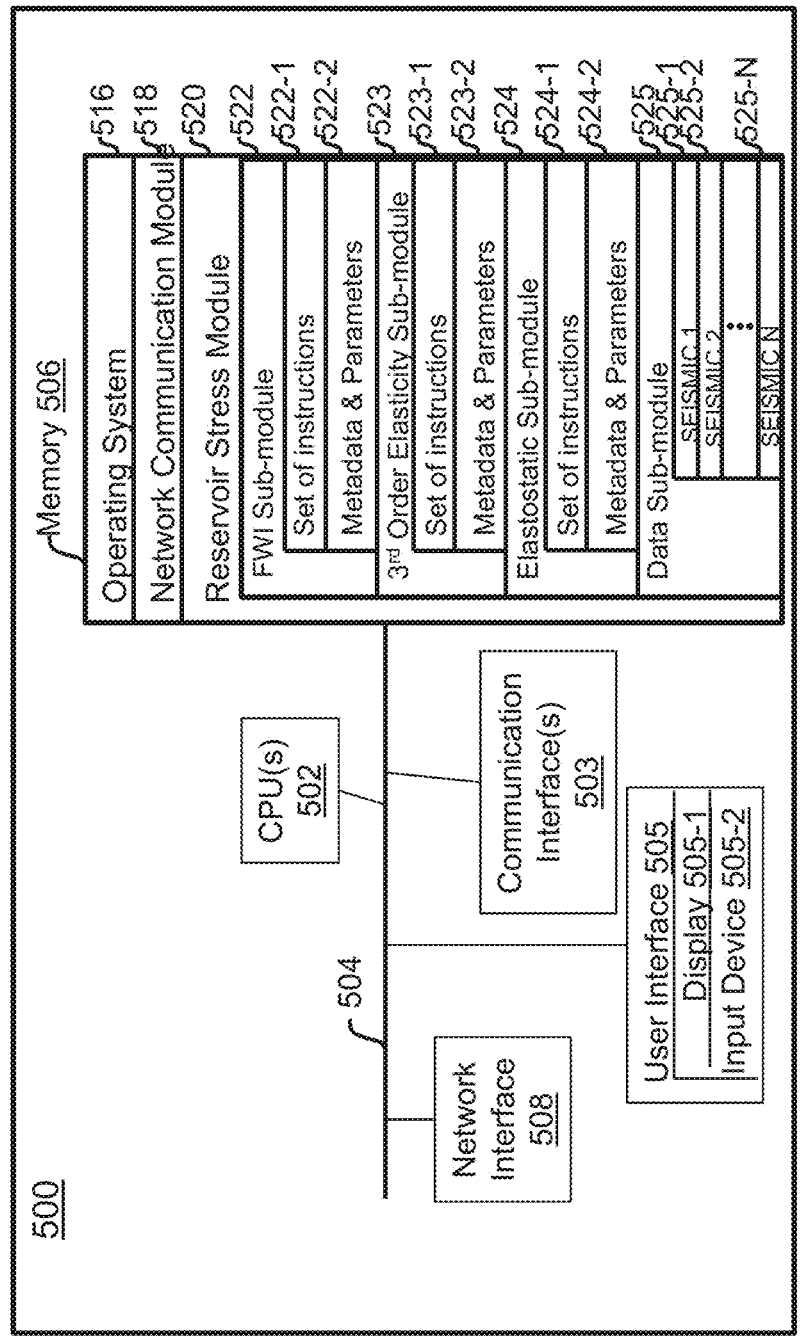
FIG. 7 is a block diagram illustrating a seismic imaging system, in accordance with some embodiments.

FIG. 7 is a block diagram illustrating a seismic imaging system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic imaging system 500 includes one or more processing units (CPUs) 502, one or more network interfaces 508 and/or other communications interfaces 503, memory 506, and one or more communication buses 504 for interconnecting these and various other components. The seismic imaging system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a seismic imaging module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the reservoir stress module 520 executes the operations disclosed previously. Reservoir stress module 520 may include data sub-module 525, which handles the seismic dataset including seismic gathers 525-1 through 525-N. This seismic data are supplied by data sub-module 525 to other sub-modules.

Full waveform inversion (FWI) sub-module 522 contains a set of instructions 522-1 and accepts metadata and parameters 522-2 that will enable it to execute the FWI operations of the method disclosed previously. The $3^{rd}$ order elasticity sub-module 523 contains a set of instructions 523-1 and accepts metadata and parameters 523-2 that will enable it to calculate strains from the elastic FWI result. The finite-difference sub-module 524 contains a set of instructions 524-1 and accepts metadata and parameters 524-2 that will enable it to invert the strains to stresses. The reservoir stress module 520 may also use the sub-module outputs and calculations to generate improved velocity models and generate seismic images using those improved velocity models. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

The method is, optionally, governed by instructions that are stored in computer memory or a non-transitory computer readable storage medium (e.g., memory 506 in FIG. 7) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, the method is described as being performed by a computer system, although in some embodiments, various operations of the method are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method comprising:
a. receiving, via one or more processors, 4D seismic data associated with a subsurface reservoir, wherein the 4D seismic data includes differences in P-wave velocities and S-wave velocities recorded at $T_1$ and $T_2$, wherein the differences in the P-wave velocities and the S-wave velocities include an anomaly in the P-wave velocities caused by reservoir stresses that occurred between $T_1$ and $T_2$;
b. inverting, via the one or more processors, the 4D seismic data to obtain stiffness changes associated with the reservoir stresses in the subsurface reservoir from $T_1$ to $T_2$ using elastic full waveform inversion, wherein inverting the 4D seismic data to obtain the stiffness changes comprises:
iterating, using the elastic full waveform inversion, the P-wave velocities and the S-wave velocities to obtain an inverted P-wave velocity perturbation model and an inverted S-wave velocity perturbation model, respectively; and
obtaining the stiffness changes based on the inverted P-wave velocity perturbation model and the inverted S-wave velocity perturbation model;
c. converting, via the one or more processors, the stiffness changes to strain changes associated with the reservoir stresses in the subsurface reservoir from $T_1$ to $T_2$ using $3^{rd}$-order elasticity relations;
d. inverting, via the one or more processors, the strain changes to obtain time-lapse stresses and reservoir pore pressure changes associated with the reservoir stresses in the subsurface reservoir from $T_1$ to $T_2$ using elastostatic Green functions, wherein the elastostatic Green functions connect the strain changes to the reservoir pore pressure changes;
e. refining, via the one or more processors, a reservoir model associated with the subsurface reservoir to generate a refined reservoir model associated with the subsurface reservoir, wherein the refined reservoir model is generated by updating the reservoir model with the time-lapse stresses and the reservoir pore pressure changes;
f. generating, via the one or more processors, a seismic image of the subsurface reservoir based on the refined reservoir model; and
g. identifying, via the one or more processors, potential drilling and production hazards associated with the subsurface reservoir based on the seismic image.

2. The method of claim 1 further comprising:
a. selecting, via the one or more processors, at least one well location associated with the subsurface reservoir based on the potential drilling and production hazards.

3. A computer system, comprising:
one or more processors;
a memory storing one or more programs, wherein the one or more programs include instructions that when executed by the one or more processors cause the computer system to:
a. receive 4D seismic data associated with a subsurface reservoir, wherein the 4D seismic data includes differences in P-wave velocities and S-wave velocities recorded at $T_1$ and $T_2$, wherein the differences in the P-wave velocities and the S-wave velocities include an anomaly in the P-wave velocities caused by reservoir stresses that occurred between $T_1$ and $T_2$;
b. invert the 4D seismic data to obtain stiffness changes associated with the reservoir stresses in the subsurface reservoir from $T_1$ to $T_2$ using elastic full waveform inversion, wherein invert the 4D seismic data to obtain the stiffness changes comprises:

iterate, using the elastic full waveform inversion, the P-wave velocities and the S-wave velocities to obtain an inverted P-wave velocity perturbation model and an inverted S-wave velocity perturbation model, respectively; and obtain the stiffness changes based on the inverted P-wave velocity perturbation model and the inverted S-wave velocity perturbation model;

c. convert the stiffness changes to strain changes associated with the reservoir stresses in the subsurface reservoir from $T_1$ to $T_2$ using $3^{rd}$-order elasticity relations;

d. invert the strain changes to obtain time-lapse stresses and reservoir pore pressure changes associated with the reservoir stresses in the subsurface reservoir from $T_1$ to $T_2$ using elastostatic Green functions, wherein the elastostatic Green functions connect the strain changes to the reservoir pore pressure changes;

e. refine a reservoir model associated with the subsurface reservoir to generate a reservoir model associated with the subsurface reservoir, wherein the refined reservoir model is generated by updating the reservoir model with the time-lapse stresses and the reservoir pore pressure changes;

f. generate a seismic image of the subsurface reservoir based on the refined reservoir model; and g. identify potential drilling and production hazards associated with the subsurface reservoir based on the seismic image.

4. A non-transitory computer readable storage medium of a computing system storing one or more programs, wherein the one or more programs comprise instructions that, when executed by one or more processors of the computing system, cause the computing system to:

a. receive 4D seismic data associated with a subsurface reservoir, wherein the 4D seismic data includes differences in P-wave velocities and S-wave velocities recorded at $T_1$ and $T_2$, wherein the differences in the P-wave velocities and the S-wave velocities include an anomaly in the P-wave velocities caused by reservoir stresses that occurred between $T_1$ and $T_2$;

b. invert the 4D seismic data to obtain stiffness changes associated with the reservoir stresses in the subsurface reservoir from $T_1$ to $T_2$ using elastic full waveform inversion, wherein invert the 4D seismic data to obtain the stiffness changes comprises:

iterate, using the elastic full waveform inversion, the P-wave velocities and the S-wave velocities to obtain an inverted P-wave velocity perturbation model and an inverted S-wave velocity perturbation model, respectively; and obtain the stiffness changes based on the inverted P-wave velocity perturbation model and the inverted S-wave velocity perturbation model;

c. convert the stiffness changes to strain changes associated with the reservoir stresses in the subsurface reservoir from $T_1$ to $T_2$ using $3^{rd}$-order elasticity relations;

d. invert the strain changes to obtain time-lapse stresses and reservoir pore pressures changes associated with the reservoir stresses in the subsurface reservoir from $T_1$ to $T_2$ using elastostatic Green functions, wherein the elastostatic Green functions connect the strain changes to the reservoir pore pressure changes;

e. refine a reservoir model associated with the subsurface reservoir to generate a refined reservoir model associated with the subsurface reservoir, wherein the refined reservoir model is generated by updating the reservoir model with the time-lapse stresses and the reservoir pore pressure changes;

f. generate a seismic image of the subsurface reservoir based on the refined reservoir model; and g. identify potential drilling and production hazards associated with the subsurface reservoir based on the seismic image.

5. The computer-implemented method of claim 1, wherein the reservoir model is an earth model of the subsurface reservoir.

6. The computing system of claim 3, wherein the one or more programs, when executed, cause the computing system to further perform:

a. select at least one well location associated with the subsurface reservoir based on the potential drilling and production hazards.

7. The computing system of claim 3, wherein the reservoir model is an earth model of the subsurface reservoir.

8. The non-transitory computer readable storage medium of claim 4, wherein the one or more programs, when executed, cause the computing system to further perform:

a. select at least one well location associated with the subsurface reservoir based on the potential drilling and production hazards.

9. The non-transitory computer readable storage medium of claim 4, wherein the reservoir model is an earth model of the subsurface reservoir.

* * * * *